United States Patent [19]

Lynch et al.

[11] Patent Number: 4,510,299

[45] Date of Patent: Apr. 9, 1985

[54] POLYMERIZATION METHOD

[75] Inventors: Michael W. Lynch, Schaumburg; Thomas J. Pullukat, Hoffman Estates, both of Ill.

[73] Assignee: Chemplex Company, Rolling Meadows, Ill.

[21] Appl. No.: 518,776

[22] Filed: Jul. 29, 1983

Related U.S. Application Data

[62] Division of Ser. No. 363,105, Mar. 29, 1982, Pat. No. 4,455,386.

[51] Int. Cl.³ .............................................. C08F 4/44
[52] U.S. Cl. ..................................... 526/129; 526/97; 526/114; 526/119; 526/124; 526/139
[58] Field of Search ................. 526/129, 139, 97, 114, 526/119, 124

[56] References Cited

U.S. PATENT DOCUMENTS

| | | |
|---|---|---|
| 2,981,725 | 4/1961 | Luft et al. |
| 3,591,656 | 7/1971 | Kroll. |
| 3,654,249 | 4/1972 | Diedrich et al. |
| 3,759,884 | 9/1973 | Tokuzumi et al. |
| 4,039,472 | 8/1977 | Hoff. |
| 4,082,692 | 4/1978 | Goldie. |
| 4,097,409 | 6/1978 | Speakman. |
| 4,243,552 | 1/1981 | Welch et al. |
| 4,333,851 | 6/1982 | Speakman et al. |
| 4,359,403 | 11/1982 | Hoff et al. |
| 4,374,753 | 2/1983 | Pullukat et al. ............... 526/129 X |

FOREIGN PATENT DOCUMENTS

| | | | |
|---|---|---|---|
| 0014524 | 8/1980 | European Pat. Off. ........... 526/129 |
| 2049709A | 12/1980 | United Kingdom. | |

*Primary Examiner*—Joseph L. Schofer
*Assistant Examiner*—J. S. Babajko
*Attorney, Agent, or Firm*—Wood, Dalton, Phillips, Mason & Rowe

[57] ABSTRACT

A catalyst and method in which the catalyst is used in association with an aluminum cocatalyst in the polymerization and interpolymerization of 1-olefins. The catalyst is prepared by (1) reacting a mono- or polyfunctional phosphorus compound with silica, alumina or the like having surface hydroxyl groups, or a mixture thereof, in which the phosphorus compound reacts with these surface hydroxyl groups, followed by (2) reacting the product of this with a Group IIa (e.g. Mg) compound and further (3) reacting this product with a Group IVB, VB or VIB (e.g. Ti) compound. Alternatively, (1) is reacted with (3) and then with (2).

15 Claims, No Drawings

POLYMERIZATION METHOD

This is a division of application Ser. No. 363,105 filed Mar. 29, 1982, now U.S. Pat. No. 4,455,386 issued June 19, 1984.

BACKGROUND OF THE INVENTION

In this invention, the polymerization catalysts useful in polymerizing and interpolymerizing 1-olefins are prepared by the reaction of silica or alumina with a functional phosphorus compound, organomagnesium compound, a titanium, vanadium, zirconium, chromium or mixture of these compounds, and a magnesium compound. These catalysts are then activated by associating them with an organoaluminum cocatalyst. These catalyst products are primarily useful for the polymerization of 1-olefins such as ethylene and the interpolymerization of these 1-olefins.

One of the features of this invention is to provide polymerization catalysts by reacting silica, alumina, or a mixture with a mono- or a multifunctional phosphorus compound, a titanium compound, and an organomagnesium compound. These catalysts are then activated by an organoaluminum compound. These catalysts are useful in the polymerization of $\alpha$-olefins and in the interpolymerization of ethylene with other $\alpha$-olefin monomers.

Another feature of this invention is to provide a catalyst with controlled comonomer incorporation so that ethylene may be interpolymerized with $\alpha$-olefins, leading to the production of improved polyolefin resins. The control is achieved by utilizing different mono- or multifunctional phosphorus compounds and their relative amounts.

K. Ziegler first discovered that the combination of compounds from Groups IV–VIB metals of the periodic table and an organometallic compound belonging to Groups I–IIIA of the periodic table formed catalysts suitable for polymerizing $\alpha$-olefins. In subsequent years, several catalysts have been disclosed as improvements over the original Ziegler catalysts. Unfortunately, many of these catalyst systems exhibit relatively low activity, low stability, and often require a costly and time-consuming catalyst removal step.

Attempts to modify Ziegler catalysts by depositing the catalyst components on an inert support have been made. Such a process is disclosed in U.S. Pat. No. 2,981,725. The supports disclosed were $MgCl_2$, silicon carbide, silica gel, $CaCl_2$, etc. These catalysts still exhibit low activities.

U.S. Pat. Nos. 3,654,249; 4,097,409; 4,082,692; 4,039,472; and 3,759,884 describe several catalysts in which titanium and vanadium halides are deposited on a support. These supports include magnesium alkoxides, magnesium chloride, magnesium hydroxy-halides, and the like.

In U.S. Pat. No. 4,243,552, a phosphorus modified support is disclosed. In this case, $MgCl_2$ is ball milled with an organophosphorus compound to form a support. This catalyst component is then combined with excess $TiCl_4$. Extensive washings are required to obtain the final catalyst. This system has the severe drawback of the environmental impact of the $TiCl_4$ containing "effluents".

British Pat. No. 2,049,709A discloses a catalyst system in which the modified silica support is prepared by reacting the silica with "chlorinating" agents. The list of chlorinating agents used includes $PCl_5$, $PCl_3$, $POCl_3$, as well as nonphosphorus-containing chlorine compounds. This patent does not disclose the use of any organophosphorus compounds.

None of the above prior art patents disclose that the treatment of an inorganic material such as silica or alumina (1) after treatment with a reactive mono- or multifunctional phosphorus compound, (2) then an organometallic compound of Group IIA or a complex and subsequently (3) with a Group IVB or VB halide or alkoxide gives a superior catalyst suitable for $\alpha$-olefin polymerization in the particle form, gas-phase, or solution form processes. Steps (2) and (3) above may be reversed.

SUMMARY OF THE INVENTION

The catalysts discussed in this invention are prepared by, (1) reacting silica, alumina or a mixture with a mono-or multifunctional phosphorus compound, (2) reacting the product of (1) with a Group IIa organometallic compound or complex, (3) reacting the product of (2) with a Group IVB, VB or VIB halide or alkoxide alone or as a mixture. Steps (2) and (3) may be reversed. The resulting solid reaction product is used with an alkyl aluminum compound for $\alpha$-olefin polymerization.

The catalysts described in this invention exhibit higher activities than normal Ziegler catalysts. The critical step in the catalyst preparation is the reaction of the silica or alumina with a functional phosphorus compound prior to the deposition of the Group IIA and Group IVB, VB or VIB complexes.

A second very important improvement is observed when these catalysts are utilized for the interpolymerization of ethylene with other $\alpha$-olefins. The low density ethylene/1-olefin interpolymers produced by these catalysts (alternatively known as linear low density polyethylene, LLDPE) have a low level of hexane soluble polymer. Such a catalyst system leads to reduced process related problems. The lower soluble fraction eases the problem of flash tank waxing often observed during LLDPE synthesis.

The catalysts described by this invention are suitable for the economic gas-phase, solution form, and particle form processes. The polymers formed by these catalysts exhibit good particle size and shape. The polymers contain very low levels of catalyst residues hence, the costly catalyst removal step is not required.

This invention provides novel catalysts, methods of making them and methods of polymerizing and interpolymerizing 1-olefins. These catalysts are especially useful for the polymerization of ethylene to high density polyethylene, and for the interpolymerization of ethylene with 1-olefins for the formation of medium and low density polymers. These improved catalysts are highly active and are well suited for the economical and energy efficient particle form, solution form and gas-phase processes.

Specifically, the object of this invention is to improve the well known Ziegler type catalyst by the method of this invention. Polymers made using the invention catalysts can have a high MI and a narrow molecular weight distribution. Thus, polymers well suited for injection molding and rotational molding applications can be manufactured. The catalysts of this invention are stable and easy flowing.

Another advantage of the invention catalysts is that they can produce ethylene-1-olefin polymers (so-called LLDPE, linear low density polyethylene), with melt elasticity properties suitable for the manufacture of high strength blown film.

The catalysts of this invention yield polymers with high melt index values at relatively low hydrogen concentration in the polymerization reaction. Thus, less hydrogen is required to obtain a given desired high melt index. This affords a savings on hydrogen and gives a higher reactivity because higher concentrations of hydrogen decrease the polymerization rate. The catalysts of this invention give a relatively narrow molecular weight distribution at a given melt index. A narrow molecular weight distribution is desirable in polymers used for injection molding and in cast film applications because better strength is obtained.

In the interpolymerization of 1-olefins and ethylene to form low density polymers of lower melt index, the catalysts of this invention can produce products with superior melt elasticity which is associated with high strength blown film.

The silica or alumina materials may contain minor amounts of zirconia, magnesia, or titania. For catalyst manufacture, it is preferred to have relatively finely divided silica or alumina, which may be porous or nonporous.

Activation of the catalyst with the cocatalyst can be accomplished within the polymerization reactor by the simultaneous feeding of both components. Alternatively, the cocatalyst can be added to the catalyst prior to entry into the polymerization zone.

DESCRIPTION OF THE PREFERRED EMBODIMENTS

This invention comprises an improved catalyst system for the polymerization and interpolymerization of α-olefins. The catalysts of this invention have higher melt index capability and reactivity than normal Ziegler catalysts. These catalysts are simple to prepare and in the preferred method, are highly economical because of the lack of necessity of calcination, solvent washing, high temperature reaction, grinding. etc.

The catalysts are prepared by first reacting a functional phosphorus compound with silica or alumina. The modified silica or alumina is then reacted with a Group IIA organometallic compound or complex. When this reaction is complete, a Group IVB, VB or VIB halide or alkoxide is added. The catalyst may also be prepared by adding the Group IVB, VB or VIB compound before the Group IIA compound. The catalyst may be used as a slurry or may be isolated as a solid by solvent evaporation or filtration. The solid catalyst or catalyst slurry is fed into the polymerization reactor along with an alkyl aluminum cocatalyst.

The inorganic oxide supports (i.e. silica or alumina) that are suitable for this invention may contain minor amounts of zirconia, magnesia, or titania, and the like. For catalyst manufacture, it is preferred to have relatively finely divided silica or alumina, which may be porous or nonporous.

Prior to reaction with the phosphorus compound, the silica or alumina should be dried to remove surface water at a temperature less than 800° C. A drying temperature of 100°–400° C. is preferred, however.

The phosphorus compounds are those reactive towards the surface hydroxyl groups of silica and alumina. Examples are: $PCl_3$, $POCl_3$, $P(OCH_3)_3$, $P(O—C_6H_5)_3$, $\{(CH_3)_2N\}_2POCl$, $(CH_3)_2PCl$, $CH_3PCl_2$ etc.

The reaction between the phosphorus compound and the silica or alumina can be conducted in a convenient manner such as in solution, neat, in the vapor phase or the like. The amount of the phosphorus compound for reaction with the silica or alumina can be in excess of the available surface hydroxyl groups, thereby facilitating a complete reaction. The excess phosphorus compound and by-products are removed as by vacuum filtration or purging with an inert gas. This process should be accomplished in the temperature range ~25° C.–200° C. It is important to avoid decomposition of the phosphorus compounds by excessive heating.

The Group IIA organometallic compounds are preferably alkyls or aryls of magnesium or its complexes with alkyl aluminum, alkyl boron, and alkyl zinc compounds. The Group IIA compounds may also contain a halide in addition to the organic functionality. The organomagnesium compounds useful in this invention are detailed in the following structural formula: $R^2MgX$, $R^3R^4Mg$, and $(R^5R^6Mg)_n \cdot AlR_3^7$. X is a halide such as F, Cl, Br and I, while $R^2$, $R^3$, $R^4$, $R^5$, $R^6$ and $R^7$ are alkyl groups containing 1–10 carbon atoms or aryl such as phenyl, naphthyl and cyclopentadienyl and n is 0.5–10. The R groups (2–7) may be the same or different. Complexes of organomagnesium compounds with organoaluminum halides can also be used. The complexes may contain small amounts of aluminum or magnesium alkoxides.

The amount of organomagnesium compound added to make the catalysts of this invention is determined by the amount of titanium compound. The ratio of Group IIA to Group IVB–VIB metal can be in the range of 0.1–100 even though 0.1–20 is the preferred group. Normally, the Mg/Ti ratio is from 0.1 to 5, most preferably 1.0.

The Group IVB, VB and VIB compounds are preferably metal halides, alkoxy-halides or alkoxides. Mixtures of the Group IVB, VB and/or VIB metals may be used. The Group IVB, VB and VIB metal on the catalyst can vary from 0.1–20 wt.%, with 1–10% preferred.

The Group IVB, VB and VIB metals that are especially useful in this invention include titanium, zirconium, vanadium and chromium.

The preferred titanium compound may be selected from the following formulas:

in which m is 1, 2, 3 or 4, $R^8$ is selected from alkyl, aryl, cycloalkyl, alkaryl, cyclopentadienyl and alkenyl, for example, ethenyl, propenyl and isopropenyl, each of these groups having 1 to 12 carbon atoms, and X is halogen. When more than one $R^8$ group occurs in the titanium compound, the groups can be the same or different.

Titanium tetrachloride is a preferred compound. The amount of titanium compound is preferably less than the amount equivalent to the surface reactive groups. Nonetheless, this invention includes amounts of titanium compound, which are from 1 to 200 percent of that equivalent amount.

Following the reaction with the titanium compound, the catalyst may be used directly as a slurry or it may be necessary to remove the excess solvent in order to have a free-flowing catalyst. In a preferred method, solvent is evaporated and collected. This results in essentially no reactor fouling and increases the bulk density of the product. Even though evaporation is the preferred method of solvent removal, filtration, centrifuging, or decantation can also be practices.

The alkyl aluminum cocatalyst can be chosen from trialkyl aluminum compounds and alkyl aluminum hydride compounds and their mixtures. The alkyl groups of suitable cocatalysts have hydrocarbon chains containing one or about ten carbon atoms and may be straight chained or branched. Triaryl aluminum compounds may also be used but because they are not so readily obtained as the alkyl compounds, they are not preferred.

Examples of suitable cocatalysts are triethylaluminum, triisobutylaluminum, tri(2-methyl pentyl)aluminum, trioctyl aluminum, diethyl aluminum hydride, diisobutyl aluminum hydride, and diethylaluminum chloride. The preferred cocatalysts are triisobutylaluminum and diisobutyl aluminum hydride. If needed, alkyl aluminum halides may be used in conjunction with trialkyl aluminum compounds as previously described.

The cocatalyst may be fed to the polymerization reactor along with the above-described solid component in the same or preferably separate lines. The molar ratio of the cocatalyst to the group IVB, VB or VIB metal in the catalyst may be 0.1:1 to 100:1 although the preferred range is 1:1 to 20:1.

The catalyst disclosed in this invention can be used to polymerize at least one 1-olefin of the formula R—CH=CH$_2$, where R is hydrogen or a straight or branched chain alkyl radical having from 1–10, preferably 1–8, carbon atoms.

Examples of such olefins are: ethylene, propylene, 1-butene, 1-hexene, 4-methyl pent-1-ene and 1-octene. The catalysts can be used for α-olefin polymerization or for the interpolymerization of ethylene with α-olefins of the above formula.

The polymerization process may be carried out in suspension, solution or in the gaseous phase, continuously or discontinuously at temperatures of from 20°–300° C., preferably from 50°–100° C., under a pressure of from 20–20,000 psi. Polymerization is preferably carried out at 300–10,000 psi.

The melt index of the polyethylene or α-olefin polymers produced by the invention catalyst can be controlled by methods known to the art such as by increasing the temperature or by adding hydrogen. High partial pressures of hydrogen can be used to yield very high melt index products.

These catalysts show relatively high activity in ethylene polymerization and interpolymerization. The polymers can be easily blended with antioxidants and pelletized for commercial use. The catalysts are useful for producing polymers of 1-olefins of 2 to 8 carbon atoms and interpolymers of these with 1-olefins of 2 to 20 carbon atoms to form solid polymers or interpolymers.

The following presents a detailed description of the invention. Examples 1–8 are to the catalyst preparation. Examples A–K illustrate the utility of these catalysts in the polymerization of α-olefins and the interpolymerization of ethylene with α-olefins. A table is provided of a summary of the polymerization data.

CATALYST PREPARATION

Example 1

A 500 ml 3-neck round bottom flask containing a stir bar was purged for 1 hr. Then 1.0 g of Davison 952 grade silica, previously calcined at ~345° C. in a N$_2$ fluidized bed, was added to the flask. The flask was purged with N$_2$ an additional 30 min. Next, 20 ml of glass distilled, degassed n-hexane was added. To the resulting slurry was added 0.22 ml of PCl$_3$. The mixture was stirred 30 min. The PCl$_3$ was added at a level of 2.5 mM/g silica.

The solvent and volatile reaction products were evaporated with a N$_2$ flush while the flask was placed in an oil bath at ~100° C. After cooling, 20 ml of n-hexane were added to reslurry the PCl$_3$-treated silica. Then 5.94 ml of a complex Bu$_2$Mg$_{6.1}$.AlEt$_3$ (6.1 E Magala) was added and stirred for 10 min. Next, 0.28 ml of TiCl$_4$ was added. There is an immediate color change to a red-brown color. The mixture was stirred 35 minutes and then dried as described above. The resultant catalyst is a brown free flowing powder.

The calculated Mg:Ti is 1:1. The titanium concentration in the catalyst is ~2.5 mM/g silica or 5.5 wt.%.

Example 2

This example shows that the catalyst can be made using a different phosphorus compound and that the order of addition of catalyst components may be reversed.

A 250 ml 3-neck round bottom flask containing an oval magnetic stir bar was purged with N$_2$ for 1 hr. Then 1.3 g of Davison 952 grade silica, previously calcined in a fluidized bed with N$_2$ at 345° C., was added to the flask. The flask was purged an additional 30 min. Then 20 ml of n-hexane was added as a slurry medium. To the slurry was added 0.25 ml of P(OCH$_3$)$_3$. The P(OCH$_3$)$_3$ was added at a level of 1.7 mM/g silica. The mixture was stirred 30 min. The catalyst was dried as described in Example 1. After cooling, 20 ml of n-hexane was added to reslurry the P(OCH$_3$)$_3$-treated silica. Next, 0.36 ml of TiCl$_4$ was added. The mixture was stirred for 30 min. The TiCl$_4$ causes the silica to turn yellow. The solution was colorless.

Then 6.52 ml of a complex Bu$_2$Mg$_{7.1}$.AlEt$_3$ (7.1 E Magala) was added to the mixture. The mixture turns to a brown-black color. The mixture is stirred 30 min. and then dried as discussed in Example 1. The resultant catalyst is a black free flowing powder.

The calculated Mg:Ti is 1:1. The titanium concentration in the catalyst is ~2.5 mM/g silica or ~5.8 wt.%.

Example 3

This example shows that POCl$_3$ can be used in place of PCl$_3$ as described in Example 1.

A 3-neck 250 ml round bottom flask containing a magnetic stir bar was purged for 30 min. Then 1.1 g of Davison 952 silica, dried at 345° C. in a fluidized bed, was added. The flask was purged an additional 30 min. Next, 20 ml of n-hexane were added followed by 0.26 ml of POCl$_3$. The POCl$_3$ was added at a level of 2.5 mM/g silica. The mixture was stirred 30 min. and then dried as described in Example 1. After cooling, the POCl$_3$-treated silica was reslurried in 20 ml of n-hexane. Then 6.5 ml of a complex Bu$_2$Mg$_{6.1}$.AlEt$_3$ (6.1 E Magala) was added and stirred for 10 min. Next, 0.30 ml of TiCl$_4$ was added. This caused the mixture to turn dark brown. The mixture was stirred 30 min. and the catalyst was dried as described in Example 1. The resultant catalyst is a brown free flowing powder.

The calculated Mg:Ti ratio is 1:1 while the titanium concentration in the catalyst is ~2.5 mM/g silica or ~5.3 wt.%.

Example 4

This example shows that the catalyst can be made with the catalyst components added in a different order. It also shows that $MgR_2$ can be used in place of the $R_2Mg_x$·$AlR'_3$ complex.

A 3-neck 250 ml round bottom flask containing an oval stir bar was purged with $N_2$ for 1½ hr. Then 1.8 g of Davison 952 grade silica, previously calcined in a $N_2$ fluidized bed at 315° C., was added to the flask and purged an additional 30 min. Then 20 ml of n-hexane were added as a slurry medium. To this slurry was added 0.42 ml of $POCl_3$. The $POCl_3$ was added at a level of 1.25 mM/g silica. The mixture was stirred 30 min. and the volatile materials removed as described in Example 1. After cooling, the $POCl_3$-treated silica was reslurried with 20 ml of n-hexane. To this mixture was added 0.25 ml $TiCl_4$. The mixture turned pale yellow and then was stirred 30 min. Next, 3.5 ml of BuEtMg (BEM) was added. The mixture turns a dark red-brown color and was then stirred an additional 30 min. The catalyst was dried as described in Example 1 to yield a black free flowing powder.

The calculated Mg:Ti is 1:1 while the titanium concentration in the catalyst is ~1.25 mM/g silica or ~3.4 wt.%.

Example 5

This example shows that alumina can be used in place of silica.

A 3-neck 250 ml round bottom flask containing an oval stir bar was purged 6X with a $N_2$/vacuum cycle. Then 1.6 g of Ketjen Grade B alumina, previously dried at 110° C. in a $N_2$ fluidized bed, was added and the flask purged 3X $N_2$/vacuum. Then 20 ml of n-hexane was added as a slurry medium. Next, 0.45 ml of $P(OCH_3)_3$ was added. The $P(OCH_3)_3$ was added at a level of 2.5 mM/g alumina. The mixture was stirred 50 min. and then dried as described in Example 1. After cooling, the $P(OCH_3)_3$-alumina was reslurried with 20 ml of n-hexane. Then 0.44 ml of $TiCl_4$ was added. The mixture was stirred 30 min. The $TiCl_4$ caused the alumina to turn yellow while the solution phase remained colorless. The mixture was stirred 30 min. and then 8.03 ml of a complex $Bu_2Mg_{7.1}$·$AlEt_3$ (7.1 E Magala) was added. The mixture turned deep brown. After stirring for 30 min. the catalyst was dried as described in Example 1. The resultant catalyst was a brown-black free flowing powder.

The calculated Mg:Ti is 1:1 while the titanium concentration in the catalyst was ~2.5 mM/g alumina or ~5.5 wt.%.

Example 6

This example is a catalyst similar to the one described in Example 2. It was prepared to compare with the catalyst described in Example 5 in order to show the silica is also useful in the inventive catalyst.

A 3-neck 250 ml round bottom flask containing an oval stir bar was purged 5X with a $N_2$/vacuum cycle. Then 2.3 g of Davison 952 grade silica, previously dried at 315° C., was added and purged again 3X with $N_2$/vacuum. Then 20 ml of n-hexane was added as the slurry medium. Next, 0.65 ml of $P(OCH_3)_3$ was added the the mixture stirred for 30 min. The $P(OCH_3)_3$ was added at a level of 2.5 mM/g silica. The silica was then dried as described in Example 1. After cooling, 20 ml of n-hexane was added to reslurry the $P(OCH_3)_3$-treated silica. Then 0.63 ml of $TiCl_4$ was added and stirred 30 min. Next 11.71 ml of a complex $Bu_2Mg_{7.1}$·$AlEt_3$ (7.1 E Magala) was added and stirred for 30 min. The catalyst was then dried as described in Example 1. The resultant catalyst is black free flowing powder.

The calculated Mg:Ti is 1:1 while the titanium concentration is ~2.5 mM/g silica or ~5.5 wt.%.

Example 7

This example shows that triphenyl phosphite $P(OC_6H_5)_3$ can be used as the phosphorus compound. A 250 ml 3-neck round bottom flask containing an oval stir bar was purged 6X vacuum/$N_2$. Then 1.0 g of Davison 952 grade silica was added and the flask purged an additional 3X vacuum/$N_2$. Next, 20 ml of n-hexane were added followed 0.39 g (1.25 mM) of $P(OC_6H_5)_3$, triphenyl phosphite. The mixture was stirred for 30 min., then the solvent and volatile reaction products were removed as described in Example 1. After cooling, the $P(OC_6H_5)_3$-treated silica was reslurried in 20 ml of n-hexane. Then 0.28 ml of $TiCl_4$ were added and stirred for 30 min. The silica is now a deep orange color while the solution appears colorless. Then 5.02 ml of a complex $Bu_2Mg_{7.1}$·$AlEt_3$ (7.1 E Magala) was added to the mixture. The mixture turns light brown and is stirred for 30 min. The catalyst was then dried as described in Example 1. The resultant catalyst is a tan free-flowing powder.

The calculated Mg:Ti ratio is 1:1 while the titanium concentration in the catalyst is ~2.5 mM/g silica or 6.9 wt.%.

Example 8

This example involves a catalyst similar to those described in Examples 2 and 6. The catalyst was prepared to test "interpolymerization" using ethylene, 1-butene, and 1-hexene.

A 3-neck 500 ml round bottom flask containing an oval stir bar was purged 6X vacuum/$N_2$. Then 3.2 g of Davison 952 grade silica, previously dried at 140° C., were added and purged 4X vacuum/$N_2$. Then 35 ml of n-hexane were added. Next, 0.90 ml of $P(OCH_3)_3$ were added to the mixture. The $P(OCH_3)_3$ level is 2.5 mM $P(OCH_3)_3$/g silica. The mixture was stirred for 30 min., then the silica was dried as described in Example 1. After cooling, the $P(OCH_3)_3$-treated silica was reslurried in 35 ml of n-hexane. Then 0.88 ml of $TiCl_4$ (2.5 mM Ti/g silica) were added and stirred for 30 min. Next, 16.06 ml of a complex $Bu_2Mg_{7.1}$·$AlEt_3$ (7.1 E Magala) was added and stirred for 30 min. The catalyst was dried as described in Example 1. The resultant catalyst is a black free-flowing powder. The calculated Mg:Ti ratio is 1:1 while the titanium concentration is 2.5 mM/g silica or 5.5 wt.%.

Polymerization

All of the catalysts studied in this work were either tested in ethylene interpolymer synthesis with 1-butene or 1-hexene as the comonomers or for ethylene or 1-hexene homopolymerizations in glass reactors. The interpolymerization experiments were conducted in either one or two liter pressure vessels using isobutane as a diluent. In the case of ethylene/1-butene copolymerization, the following procedure was followed: add catalyst, cocatalyst, close reactor. Then add 500 ml isobutane and 50 psi H$_2$ gauge. Then ethylene and 1-butene is added and the total reactor pressure of 350 psi is obtained. Ethylene is then supplied on demand to maintain pressure while 16 g of 1-butene is added over the 1 hr. polymerization time to maintain the 1-butene concentration. The test conditions were:

Total pressure = 350 psi
H$_2$ = 50 psi
22 wt.% 1-butene
500 ml isobutane diluent
Temp. = 160° F. (71.1° C.)

Ethylene-1-hexene copolymers were prepared in a two liter pressure vessel. One liter of isobutane is used as the diluent. The procedure is as follows: add catalyst and cocatalyst, close reactor. Pressure in 1 l of isobutane then 50 psi H to gauge. Then 1-hexene and ethylene are added simultaneously until the desired wt.% 1-hexene and total reactor pressure are reached. Ethylene is added during the reaction on demand. The test conditions were:

Total pressure = 300 psi
H$_2$ 50 psi
26 wt.% 1-hexene
Temp. = 155° F. (68.3° C.)
1 liter isobutane diluent Bottle Polymerization α-olefins were polymerized in 1 liter glass-crown-cap bottles sealed with Buna-n-rubber septums under the standard crown cap. The procedure is described below:
(1) 1 liter bottle is dried at 130° C. at least 12 hr.
(2) The bottle is cooled to 25° C. with a N$_2$ purge for 1 hr.
(3) The catalyst and cocatalyst are added and the bottle is capped.
(4) Dry, degassed n-heptane is added through a needle through the septum (400 ml).
(5) Then ethylene is supplied on demand at 22 psi or a fixed amount of α-olefin is added.
(6) The bottle contents are stirred with a magnetic stir.
(7) The polymerization temperature is ~25° C. and maintained by an H$_2$O bath.

Polyethylene:
Conditions: Ethylene pressure = 22 psi
Solvent 400 ml n-heptane
Temp. = 25° C.
Poly-1-hexene:
1-hexene ~15 g
Solvent n-heptane temp. = 25° C.

Polymerizations

Example A

The catalyst described in Example 1 above was tested for ethylene 1-butene copolymerization at 160° F. (71.1° C.), 22 wt.% 1-butene, 50 psi H$_2$ and 350 psi total pressure. The solid catalyst weighted 0.0218 g while 0.22 ml of (25 wt.% solution in heptane) triisobutylaluminum (TIBAL) were added, Al:Ti 7:1. The polymerization was run for 1 hr. The catalyst reactivity was 4784 g PE/g cat/hr or 86,400 g PE/g Ti/hr. The resultant polymer consisted of a powder with good particle size and shape, and a low level of fines. The polymer had a density (ρ) of 0.927 g/cm$^3$ and a melt index (MI) of 0.9 g/10 min[1] and an R$_D$ value of ~3.5[2].

Example B

The catalyst described in Example 2 above was used for ethylene 1-butene copolymerization as described above for Example A. 0.0215 g of catalyst and 0.055 ml of TIBAL (Al:Ti 2:1) were added to the reactor.

The catalyst reactivity was 2247 g PE/g cat/hr. or 38,740 g PE/g Ti/hr. The polymer exhibited good particle size and shape. The polymer had a ρ=0.924 g/cm$^3$[1], an MI ~0.27 g PE/10 min[2] and 5.7 wt.% hexane extractables[3].

Example C

The same catalyst was used as in Example B. 0.0258 g catalyst and 0.26 ml TIBAL (Al:Ti ~7.3:1) were added to the reactor. The catalyst was tested for ethylene/1-butene copolymerization. The catalyst exhibited reactivity of 2527 g PE/g catalyst/hr. or 43,570 g PE/g Ti/hr. The polymer had a density of 0.924 g/cm$^3$, an MI of ~1.6[1] g/10 min. and hexane extractables[3] of ~9.4 wt.%.

Example D

The catalyst described in Example 2 was tested for ethylene/1-hexene copolymerization. The conditions were 155° F. (68.3° C.), total pressure 300 psi, H$_2$ 50 psi, 26 wt.% 1-hexene. 0.0356 g of catalyst and 0.36 ml TIBAL (Al:Ti ~7.3:1) were added to the reactor. The catalyst reactivity was 3713 g PE/g cat/hr. or 64,020 g PE/g Ti/hr. The density was 0.935 g/cm$^3$, MI ~1.45[1], hexane extractables 7.7 wt.%[3] and R$_D$=4.2[2].

Example E

The catalyst described in Example 3 was tested for ethylene/1-butene copolymerization under the conditions discussed in Example A. 0.0558 g catalyst and 0.56 ml TIBAL (Al:Ti ~7.3:1) were added to the reactor. The catalyst reactivity was 2604 g PE/g cat/hr. or 49,040 g PE/g Ti/hr. The polymer density was 0.927 g/cm$^3$, MI=1.5[1], hexane extractables[3] ~9.2 wt.% and R$_D$=3.8[2].

Example F

The catalyst described in Example 4 was treated for ethylene/1-butene copolymerization under the conditions used in Example A. 0.0433 g of catalyst and 0.43 ml of TIBAL were added to the reactor (Al:Ti ~12.4:1). The catalyst reactivity was 1760 g PE/g cat/hr. or 51,760 g PE/g Ti/hr. The polymer had a density of 0.926 g/cm$^3$, an MI ~1.4[1] and hexane extractables 8.0[3] wt.%.

Example G

The catalyst described in Example 5 was tested for ethylene polymerization in the bottle reactor. 0.1178 g of catalyst and 1.2 ml of TIBAL were used. The ethylene polymerization was carried out for 1 hr. The reactivity was 282 g PE/g cat/hr. or 5130 g PE/g Ti/hr. The polymer had good particle size and shape. The particles were larger than obtained with the silica based catalyst (see Ex. H).

Example H

The catalyst described in Example 6 was tested for ethylene polymerization in the bottle reactor. 0.1702 g of catalyst and 1.70 ml of TIBAL were used. The ethylene polymerization was carried out for 1 hr. The reactivity was 379 g PE/g cat/hr. or 6891 g PE/g Ti/hr. The polymer had good particle size and shape.

Example I

The catalyst in Example 6 was tested for the homopolymerization of 1-hexene in the bottle reactor. 0.2055 g of catalyst and 2.0 ml of TIBAL were added to the bottle. Then 400 ml of n-heptane were added followed by 16.0 g of 1-hexene. The polymerization was conducted at 25° C. for 5 hr. The polymer was isolated by pouring the solution onto an equal volume of methanol. The polymer yield was 1.85 g. The reactivity was 1.45 g polyhexene/g cat/hr.

Example J

The catalyst described in Example 7 above was used for ethylene 1-hexene copolymerization as described in Example D except that only 20 wt.% 1-hexene was used. 0.0876 g catalyst and 0.88 ml TIBAL (Al:Ti 7.8:1) were added to the reactor. The catalyst exhibited reactivity of 2734 g PE/g cat/hr. or 39,620 g PE/g Ti/hr. The polymer had a density of 0.939 g/cm$^3$ and an MI of ~3.73[1] g/10 min.

Example K

The catalyst described in Example 8 was tested for interpolymerization in the bottle reactor using ethylene, 1-butene and 1-hexene. 0.1900 g of the catalyst and 1.9 ml of TIBAL were added to the bottle. Then 400 ml of n-heptane were added followed by 7.9 grams of 1-hexene, 5.0 g of 1-butene and ethylene on demand at 24 psig. The bottle was "cooled" with ~1 l of H$_2$O in a beaker. Despite the cooling, the contents of the polymerization vessel rose to 60° C. After 1 hr., the bottle was vented and the contents filtered while hot. This gave ~22.6 grams of a fluffy nonsticky polymer. That gives a catalyst reactivity of 159 g PE/g cat/hr.

References (1) Melt Index—ASTM D-1238 52T
(2) R$_D$—See *Polymer Engineering and Science*, Vol. II, pages 124–128 (1971).
(3) The hexane extraction experiments were carried out using soxlet extractors. The polymer was extracted for 16 hours.

POLYMERIZATION DATA

| Catalyst | Polymerization | Type | Reactivity g PE/g cat/hr. | Reactivity g PE/g Ti/hr. | M.I. g/10 min. | Density g/cm$^3$ | Hexane Extractable Wt. % |
| --- | --- | --- | --- | --- | --- | --- | --- |
| 1 | A | E/B | 4784 | 86,400 | 0.90 | 0.927 | — |
| 2 | B | E/B | 2247 | 38,740 | 0.27 | 0.924 | 5.7 |
| 2 | C | E/B | 2527 | 43,570 | 1.60 | 0.924 | 9.4 |
| 2 | D | E/H | 3713 | 64,020 | 1.45 | 0.935 | 7.7 |
| 3 | E | E/B | 2604 | 49,040 | 1.50 | 0.927 | 9.2 |
| 4 | F | E/B | 1760 | 51,760 | 1.40 | 0.926 | 8.0 |
| 7 | J | E/H | 2734 | 39,620 | 3.73 | 0.939 | — |
| 5 | G* | E | 282 | 5130 | — | — | — |
| 6 | H* | E | 379 | 6891 | — | — | — |
| 8 | K* | E/B/H | 159 | 2891 | — | — | — |
| 6 | I* | H | 1.45 | — | — | — | — |

E = Ethylene
B = Butene
H = Hexene
*Reactivity is lower due to lower ethylene pressure in glass reactor.

We claim:

1. The method of making polymers and interpolymers from polymerizable 1-olefins which comprises polymerizing at least one of said olefins under polymerizing conditions with a catalyst system comprising an alkyl or aryl aluminum compound cocatalyst and a catalyst prepared by:
   (1) reacting a metal oxide support containing silica or alumina having surface hydroxyl groups or both with a functional organophosphorus compound which is a reactive towards said surface hydroxyl groups;
   (2) reacting the product of (1) with a Group IIA organometallic compound, or Group IIA organometallic complex with alkyl aluminum, alkyl boron or alkyl zinc, or mixtures; and
   (3) reacting the product of (2) with a Group IVB, VB or VIB metal halide, alkoxy-halide, alkoxide or mixtures of these, or reacting the product of (1) with a Group IVB, VB or VIB metal halide, alkoxy-halide or alkoxide or mixtures and then with a Group IIA organometallic compound, or Group IIA organometallic complex with alkyl aluminum, alkyl boron or alkyl zinc, or mixtures.

2. The method of claim 1 wherein said phosphorus compound of (1) comprises a mono- or a multifunctional phosphorus compound.

3. The method of claim 1 wherein said support also contains titania, zirconia or magnesia or mixtures thereof.

4. The method of claim 1 wherein said Group IIA organometallic compound of (2) comprises an alkyl or aryl of magnesium or a complex thereof.

5. The method of claim 1 wherein the mole ratio of the group IIA metal of (2) to the Group IVB, VB or VIB metal of (3) is about 0.1–100.

6. The method of claim 1 wherein the mole ratio of the Group IIA metal of (2) to the Group IVB, VB or VIB metal of (3) is about 0.1–20.

7. The method of claim 1 wherein the Group IIA compound of (2) contains a halide and the Group IVB, VB or VIB metal of (3) contains an alkoxide.

8. The method of claim 1 wherein the Group IVB, VB or VIB compound of (3) comprises a halide, alkoxide or oxyhalide or mixtures thereof.

9. The method of claim 1 wherein the amount of Group IVB, VB or VIB metal in the catalyst is from about 0.1–20 wt.%.

10. The method of claim 1 wherein the amount of Group IVB, VB or VIB metal in the catalyst is from about 0.1–10 wt.%.

11. The method of claim 1 wherein the support of (1) is dried at about 100°–400° C. prior to reacting with said phosphorus compound.

12. The method of claim 1 wherein the amount of phosphorus in the reaction is in excess of the stoichiometric amount required for reaction with said hydroxyl groups.

13. The method of claim 1 wherein the reaction of (1) is at a temperature of about 25°–200° C. and one that avoids substantial decomposition of said phosphorus compound.

14. The method of claim 1 wherein the molar ratio of the amount of cocatalyst to the amount of Group IVB, VB or VIB metal of step (3) is about 0.1–100:1.

15. The method of claim 1 wherein the molar ratio of the amount of cocatalyst to the amount of Group IVB, VB or VIB metal of step (3) is about 0.1–20:1.

* * * * *